United States Patent
Ziakas et al.

(10) Patent No.: US 10,331,614 B2
(45) Date of Patent: Jun. 25, 2019

(54) METHOD AND APPARATUS FOR SERVER PLATFORM ARCHITECTURES THAT ENABLE SERVICEABLE NONVOLATILE MEMORY MODULES

(71) Applicants: INTEL CORPORATION, Santa Clara, CA (US); Dimitrios Ziakas, Hillsboro, OR (US); Bassam N. Coury, Dupont, WA (US); Mohan J. Kumar, Aloha, OR (US); Murugasamy K. Nachimuthu, Hillsboro, OR (US); Thi Dang, Olympia, WA (US); Russell J. Wunderlich, Livermore, CO (US)

(72) Inventors: Dimitrios Ziakas, Hillsboro, OR (US); Bassam N. Coury, Dupont, WA (US); Mohan J. Kumar, Aloha, OR (US); Murugasamy K. Nachimuthu, Hillsboro, OR (US); Thi Dang, Olympia, WA (US); Russell J. Wunderlich, Livermore, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/025,988

(22) PCT Filed: Nov. 27, 2013

(86) PCT No.: PCT/US2013/072159
§ 371 (c)(1),
(2) Date: Mar. 30, 2016

(87) PCT Pub. No.: WO2015/080717
PCT Pub. Date: Jun. 4, 2015

(65) Prior Publication Data
US 2016/0239460 A1 Aug. 18, 2016

Related U.S. Application Data

(63) Continuation of application No. PCT/US2013/072159, filed on Nov. 27, 2013.

(51) Int. Cl.
*G06F 11/00* (2006.01)
*G06F 15/78* (2006.01)
(Continued)

(52) U.S. Cl.
CPC ........ *G06F 15/7803* (2013.01); *G06F 11/108* (2013.01); *G06F 11/1068* (2013.01);
(Continued)

(58) Field of Classification Search
CPC ............... G06F 11/1068; G06F 11/108; G06F 11/1092; G06F 11/3485; G06F 11/1662; G06F 11/2094
See application file for complete search history.

(56) References Cited

U.S. PATENT DOCUMENTS 6,223,301 B1* 4/2001 Santeler ............. G06F 11/1044
714/6.2
6,530,033 B1* 3/2003 Raynham ............. G06F 13/409
365/189.05
(Continued)

FOREIGN PATENT DOCUMENTS

CN  101796494 A  8/2010
CN  103080917 A  5/2013
(Continued)

OTHER PUBLICATIONS

International Preliminary Report on Patentability, PCT/US2013/072159, dated Jun. 9, 2016, 6 pages.
(Continued)

*Primary Examiner* — Charles Ehne
(74) *Attorney, Agent, or Firm* — Compass IP Law PC (57) ABSTRACT

Systems and methods of implementing server architectures that can facilitate the servicing of memory components in computer systems. The systems and methods employ nonvolatile memory/storage modules that include nonvolatile memory (NVM) that can be used for system memory and mass storage, as well as firmware memory. The respective NVM/storage modules can be received in front or rear-loading bays of the computer systems. The systems and methods further employ single, dual, or quad socket processors, in which each processor is communicably coupled to at least some of the NVM/storage modules disposed in the front or rear-loading bays by one or more memory and/or input/output (I/O) channels. By employing NVM/storage modules that can be received in front or rear-loading bays of computer systems, the systems and methods provide memory component serviceability heretofore unachievable in computer systems implementing conventional server architectures.

10 Claims, 9 Drawing Sheets

(51) Int. Cl.
*G06F 11/10* (2006.01)
*G06F 11/34* (2006.01)
*G06F 11/16* (2006.01)

(52) U.S. Cl.
CPC ...... *G06F 11/1092* (2013.01); *G06F 11/1662* (2013.01); *G06F 11/3485* (2013.01); *G06F 2201/805* (2013.01)

(56) References Cited

U.S. PATENT DOCUMENTS

| | | | |
|---|---|---|---|
| 6,598,174 B1 | 7/2003 | Parks et al. | |
| RE39,855 E | 9/2007 | Wong | |
| 2002/0194530 A1* | 12/2002 | Santeler | G06F 11/2064 714/6.12 |
| 2003/0125076 A1 | 7/2003 | Seppala et al. | |
| 2003/0193403 A1 | 10/2003 | Post et al. | |
| 2004/0044838 A1 | 3/2004 | Nickel et al. | |
| 2007/0260715 A1 | 11/2007 | Alexandrov et al. | |
| 2009/0037657 A1 | 2/2009 | Bresniker | |
| 2009/0063895 A1* | 3/2009 | Smith | G06F 3/0607 714/6.32 |
| 2009/0240873 A1* | 9/2009 | Yu | G06F 3/0608 711/103 |
| 2010/0274959 A1 | 10/2010 | Karamcheti et al. | |
| 2011/0047313 A1* | 2/2011 | Hui | G06F 13/4022 710/314 |
| 2011/0208900 A1 | 8/2011 | Schuette et al. | |
| 2013/0262739 A1* | 10/2013 | Bennett | G06F 3/0689 711/102 |
| 2015/0019792 A1* | 1/2015 | Swanson | G06F 9/466 711/102 |

FOREIGN PATENT DOCUMENTS

| | | |
|---|---|---|
| CN | 103210379 A | 7/2013 |
| JP | H07152647 A | 6/1995 |
| JP | 2005276208 A | 10/2005 |
| JP | 2010538372 A | 12/2010 |
| JP | 2012530991 A | 12/2012 |

OTHER PUBLICATIONS

International Search Report and Written Opinion for PCT Patent Application No. PCT/US2013/072159, dated Jul. 31, 2014, 10 pages.
Summary of KR Office Action, Patent Application No. 10-2016-7010670, dated Feb. 3, 2017, 1 page.
International Search Report and Written Opinion received for PCT Patent Application No. PCT/US2013/072159, dated Jul. 31, 2014, 10 pages.
Extended European Search Report for Patent Application No. 13898057.8, dated Jun. 20, 2017, 8 pages.
Organized Translation of Notice of Reasons for Rejection for Japanese Patent Application No. 2016-519935, dated Sep. 12, 2017, 4 pages.
Organized Translation of Notice of Reasons for Second Rejection for Japanese Patent Application No. 2016-519935, dated Jun. 26, 2018, 5 pages.
Chinese and English Translation of P.R. China State Intellectual Property Office First Office Action for Patent Application No. 201380080557.4, dated Aug. 2, 2018, 25 pages.
Organized Translation of Notice of Reasons for Third Rejection for Japanese Patent Application No. 2016-519935, dated Dec. 21, 2018, 3 pages.
Chinese and English Translation of P.R. China State Intellectual Property Office Second Office Action for Patent Application No. 201380080557.4, dated Feb. 28, 2019, 13 pages.

* cited by examiner

METHOD AND APPARATUS FOR SERVER PLATFORM ARCHITECTURES THAT ENABLE SERVICEABLE NONVOLATILE MEMORY MODULES

TECHNICAL FIELD

Embodiments described herein relate generally to server architectures, and more specifically to systems and methods of implementing a server architecture configured to facilitate the servicing of nonvolatile memory components.

BACKGROUND

A computer system that implements conventional server architecture typically includes a chassis, a motherboard mounted to the chassis, and one or more front-loading bays mounted to the chassis. The motherboard can have one or more processor sockets coupled thereto for receiving one or more processors, respectively, as well as one or more daughterboard connectors for receiving one or more mezzanine or riser boards, respectively. In such a computer system, the front-loading bays are typically configured to receive mass storage devices that can include magnetic media (e.g., hard disc drives), optical media (e.g., compact disc (CD) drives, digital video disc (DVD) drives), etc. Such mass storage devices may conform to an industry standard form factor, and may be configured to be "hot-swappable", which means that the mass storage devices can be removed from and installed into the respective front-loading bays without powering-down the computer system. The mezzanine or riser boards are typically configured to include one or more memory modules, such as one or more dynamic random access memory (DRAM)-based dual in-line memory modules (DIMMs), portions of which may be allocated as system memory as well as cache memory.

In such a computer system implementing conventional server architecture, in order to service one or more failed components on the mezzanine or riser boards, such as one or more failed DIMMs or other memory components, it is generally necessary to power-down the computer system and open the chassis to access and/or replace the failed memory components. However, such servicing of memory components in a computer system, even if infrequent, can prove to be time consuming, complicated, and expensive.

BRIEF DESCRIPTION OF THE DRAWINGS

The accompanying drawings, which are incorporated in and constitute part of this specification, illustrate one or more embodiments described herein, and, together with the Detailed Description, explain these embodiments. In the drawings:

FIG. 3b is a block diagram of exemplary memory components included in the nonvolatile memory/storage module of FIG. 3a;

FIG. 5b is a plan view of an exemplary memory module included in the second alternative embodiment of FIG. 5a;

DESCRIPTION OF EMBODIMENTS

Systems and methods of implementing server architectures are disclosed that can facilitate the servicing and dual-porting of memory components in computer systems. The disclosed systems and methods employ nonvolatile memory/storage modules that can conform to an industry standard form factor, and include nonvolatile memory (NVM) that can be used for persistent memory, system memory, and mass storage, as well as firmware memory. The respective nonvolatile memory/storage modules are configured to be received in front and/or rear-loading bays of the computer systems, and are further configured to be "hot-swappable" such that the nonvolatile memory/storage modules can be removed from and installed into the respective front/rear-loading bays without powering-down the computer system. The disclosed systems and methods can further employ single, dual, or quad socket processors, in which each processor is communicably coupled to at least some of the nonvolatile memory/storage modules disposed in the front and/or rear-loading bays by one or more memory and/or input/output (I/O) channels. By employing hot-swappable nonvolatile memory/storage modules that can be received in front and/or rear-loading bays of computer systems, the disclosed systems and methods can provide memory component serviceability heretofore unachievable in computer systems implementing conventional server architectures.

Moreover, because memory subsystems that include nonvolatile memory/storage modules have persistence characteristics, the servicing of such nonvolatile memory/storage modules becomes more important due to the possible need to retrieve data stored on those NVM modules. In contrast, the servicing of volatile memory modules has generally been less important because data stored on such volatile memory modules are effectively lost when those modules fail. For this reason, memory subsystems that include volatile memory modules (e.g., dynamic random access memory (DRAM)-based mezzanine or riser boards) have traditionally received either little servicing or highly intrusive servicing, which can involve powering-down the computer system and opening the chassis to access the failed volatile memory module. The importance of servicing nonvolatile memory/storage modules that can store data persistently has increased the need for easily serviceable server architectures and topologies, such as those that provide hot-swapping and dual-porting capabilities.

Figure 1:
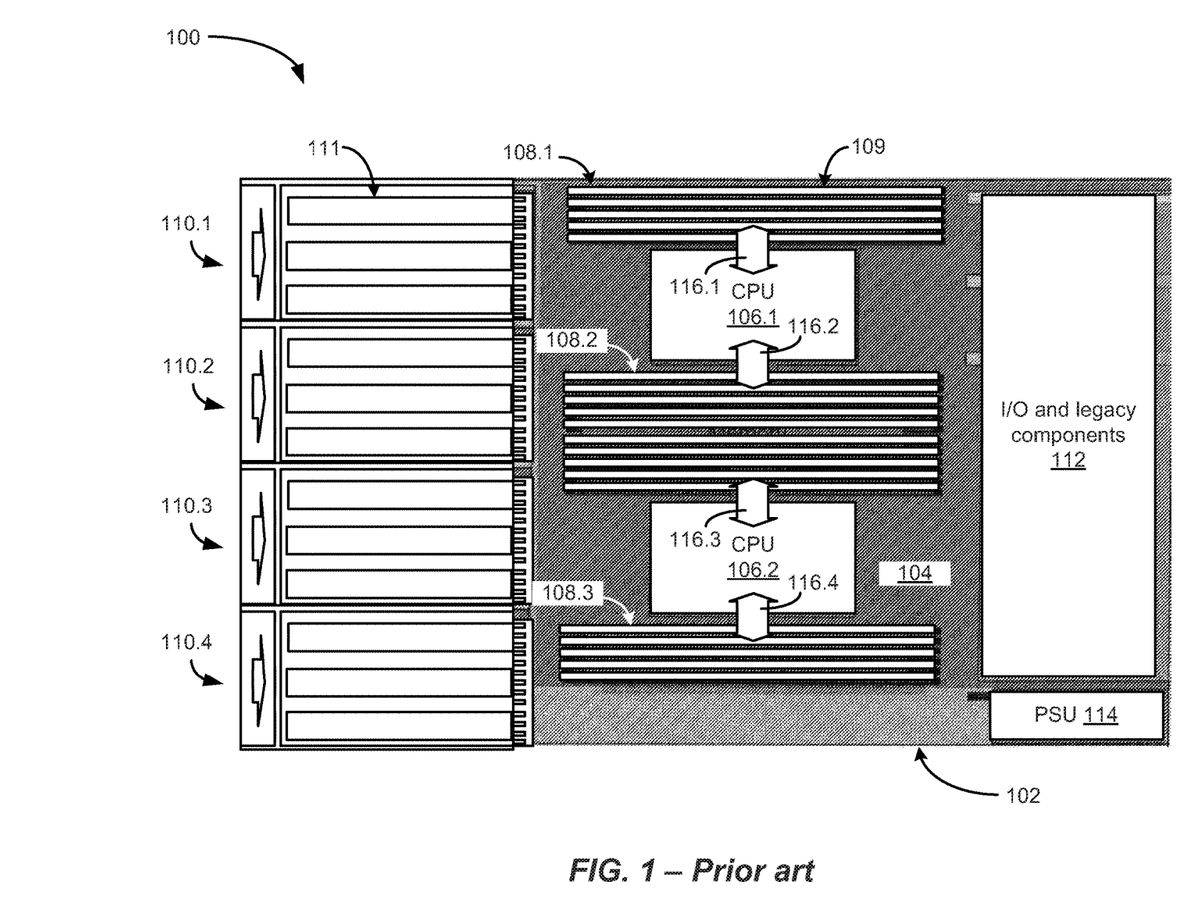
FIG. 1 is a top plan view of a computer system that implements conventional server architecture.

FIG. 1 depicts a computer system 100 that implements conventional server architecture. As shown in FIG. 1, the computer system 100 includes a chassis 102, a motherboard 104 mounted to the chassis 102, and a plurality of front-loading bays 110.1, 110.2, 110.3, 110.4 mounted to the chassis 102. The motherboard 104 has a plurality of processor sockets coupled thereto for receiving a plurality of central processing units (CPUs) (also referred to herein as "processors") 106.1, 106.2, respectively, as well as a plurality of groups of daughterboard sockets for receiving a plurality of groups of auxiliary boards 108.1, 108.2, 108.3, respectively, such as mezzanine boards, riser boards, or any other suitable printed circuit boards (PCBs). The motherboard 104 further has a plurality of input/output (I/O) and legacy components 112 coupled thereto, and the computer system 100 further includes a power supply unit (PSU) 114 mounted to the chassis 102.

Each of the front-loading bays 110.1, 110.2, 110.3, 110.4 is configured to receive a plurality of mass storage devices, such as a mass storage device 111 received in the front-loading bay 110.1. The mass storage devices (e.g., the mass storage device 111) received in the respective front-loading bays 110.1, 110.2, 110.3, 110.4 can include magnetic media (e.g., hard disc drives), optical media (e.g., compact disc (CD) drives, digital video disc (DVD) drives), etc. Further, the mass storage devices (e.g., the mass storage device 111) may conform to an industry standard form factor, and may be configured to be hot-swappable, meaning that the mass storage devices can be removed from and installed into the respective front-loading bays 110.1-110.4 without powering-down the computer system 110.

The groups of auxiliary boards 108.1, 108.2, 108.3 are each configured to include a plurality of memory modules, such as a memory module 109 included in the group of auxiliary boards 108.1. The plurality of memory modules (e.g., the memory module 109) can each include one or more dual in-line memory modules (DIMMs), such as dynamic random access memory (DRAM)-based double data rate (DDR) DIMMs, portions of which may be allocated as system memory as well as cache memory. The DRAM-based memory modules (e.g., the memory module 109) are communicably coupled to the respective processors 106.1, 106.2 by a plurality of memory or I/O channels, such as DDR memory channels 116.1, 116.2, 116.3, 116.4.

Specifically, the DRAM-based memory modules included in the group of auxiliary boards 108.1 are communicably coupled to the processor 106.1 by the DDR memory channels 116.1, and the DRAM-based memory modules included in the group of auxiliary boards 108.2 are communicably coupled to the processor 106.1 by the DDR memory channels 116.2. Further, the DRAM-based memory modules included in the group of auxiliary boards 108.2 are communicably coupled to the processor 106.2 by the DDR memory channels 116.3, and the DRAM-based memory modules included in the group of auxiliary boards 108.3 are communicably coupled to the processor 106.2 by the DDR memory channels 116.4. In the computer system 100 (see FIG. 1) implementing the conventional server architecture, it is generally necessary to power-down the computer system 100 and open the chassis 102 to access and/or replace failed memory components, such as the DRAM-based memory modules included in the groups of auxiliary boards 108.1, 108.2, 108.3. Such servicing of memory components in the computer system 100, even if infrequent, can prove to be time consuming, complicated, and expensive.

Figure 2:
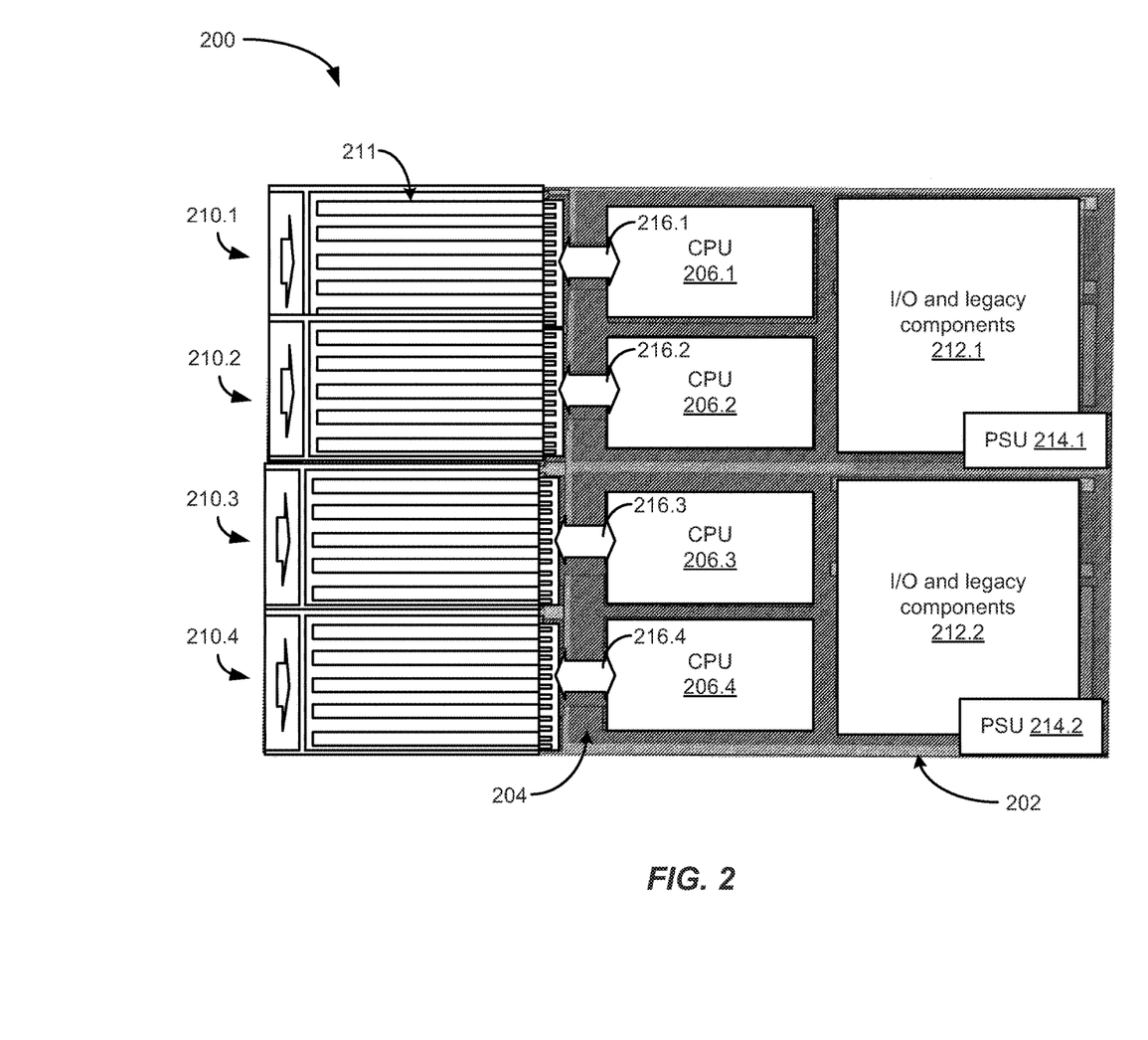
FIG. 2 is a top plan view of an exemplary computer system that implements exemplary server architecture, in accordance with the present application.

FIG. 2 depicts an illustrative embodiment of an exemplary computer system 200 that implements exemplary server architecture, in accordance with the present application. As shown in FIG. 2, the computer system 200 includes a chassis 202, a motherboard 204 mounted to the chassis 202, and a plurality of front-loading bays 210.1, 210.2, 210.3, 210.4 mounted to the chassis 202. The motherboard 204 has a plurality of processor sockets coupled thereto for receiving a plurality of CPUs (processors) 206.1, 206.2, 206.3, 206.4, respectively. The motherboard 204 can further have a plurality of input/output (I/O) and legacy components 212.1, 212.2 coupled thereto. For example, the I/O and legacy components 212.1, 212.2 can include integrated drive electronics (IDE) components, universal serial bus (USB) components, local area network (LAN) components, audio components, etc. The computer system 200 can further include a plurality of power supply units (PSUs) 214.1, 214.2 mounted to the chassis 202.

In the computer system 200 (see FIG. 2), each of the front-loading bays 210.1, 210.2, 210.3, 210.4 is configured to receive a plurality of nonvolatile memory/storage modules, such as a nonvolatile memory/storage module 211 received in the front-loading bay 210.1. The nonvolatile memory/storage modules (e.g., the nonvolatile memory/storage module 211) received in the respective front-loading bays 210.1, 210.2, 210.3, 210.4 can include nonvolatile memory (NVM) that can be used, as desired and/or required, for persistent memory, system memory, and mass storage, as well as firmware memory. For example, the nonvolatile memory included in the respective nonvolatile memory/storage modules can include NAND or NOR flash memory that uses a single bit per memory cell, multi-level cell (MLC) memory such as NAND flash memory with two bits per cell, polymer memory, phase-change memory (PCM), nanowire-based charge-trapping memory, ferroelectric transistor random access memory (FeTRAM), 3-dimensional cross-point memory, nonvolatile memory that uses memory resistor (memristor) technology, ovonic unified memory, chalcogenide random access memory (CRAM), byte-addressable persistent random access memory (BPRAM), magneto-resistive random access memory (MRAM), programmable metallization cell (PMC) memory, resistive random access memory (RRAM), ferromagnetic memory, spin-transfer torque random access memory (SPRAM), spin tunneling RAM (STRAM), dielectric memory, or any other suitable nonvolatile memory based on any other suitable NVM technology.

For purposes of this disclosure, the nonvolatile memory (NVM) included in the respective nonvolatile memory/storage modules (e.g., the nonvolatile memory/storage module 211) can have at least some or more of the following characteristics:

(1) the NVM can maintain its data content even if power is removed;

(2) the NVM is randomly addressable;

(3) the NVM is writable and erasable at a low level of granularity (e.g., a byte level of granularity);

(4) the NVM can be used as system memory, and can be allocated all or a portion of the system memory address space;

(5) the NVM can be used as persistent memory, mass storage, and optionally as firmware memory; and (6) the NVM can be coupled to at least one processor over a bus using a transactional protocol (i.e., a protocol that supports transaction identifiers) to distinguish different transactions so that such transactions can be completed out-of-order, allowing access at a level of granularity small enough to support operation of the nonvolatile memory as system memory (e.g., using a cache line size of 64 or 128 bytes). For example, the nonvolatile memory/storage modules can each be configured as a solid-state drive (SSD), or any other suitable persistent data storage medium. Further, the bus coupling a respective nonvolatile memory/storage module to a processor may be a double data rate (DDR) memory bus over which can be run a transactional protocol. Such a bus may be a Peripheral Component Interconnect express (PCIe) bus, or any other suitable bus utilizing a transactional protocol with a suitable transaction payload size.

The nonvolatile memory/storage modules (e.g., the nonvolatile memory/storage module 211) received in the respective front-loading bays 210.1, 210.2, 210.3, 210.4 are communicably coupled to the respective processors 206.1, 206.2, 206.3, 206.4 by a plurality of memory channels (e.g., DDR memory channels) and/or I/O or fabric interconnects. Specifically, the nonvolatile memory/storage modules received in the front-loading bay 210.1 are communicably coupled to the processor 206.1 by DDR memory channels and/or I/O or fabric interconnects 216.1, the nonvolatile memory/storage modules received in the front-loading bay 210.2 are communicably coupled to the processor 206.2 by DDR memory channels and/or I/O or fabric interconnects 216.2, the nonvolatile memory/storage modules received in the front-loading bay 210.3 are communicably coupled to the processor 206.3 by DDR memory channels and/or I/O or fabric interconnects 216.3, and the nonvolatile memory/storage modules received in the front-loading bay 210.4 are communicably coupled to the processor 206.4 by DDR memory channels and/or I/O or fabric interconnects 216.4.

Figure 3A:
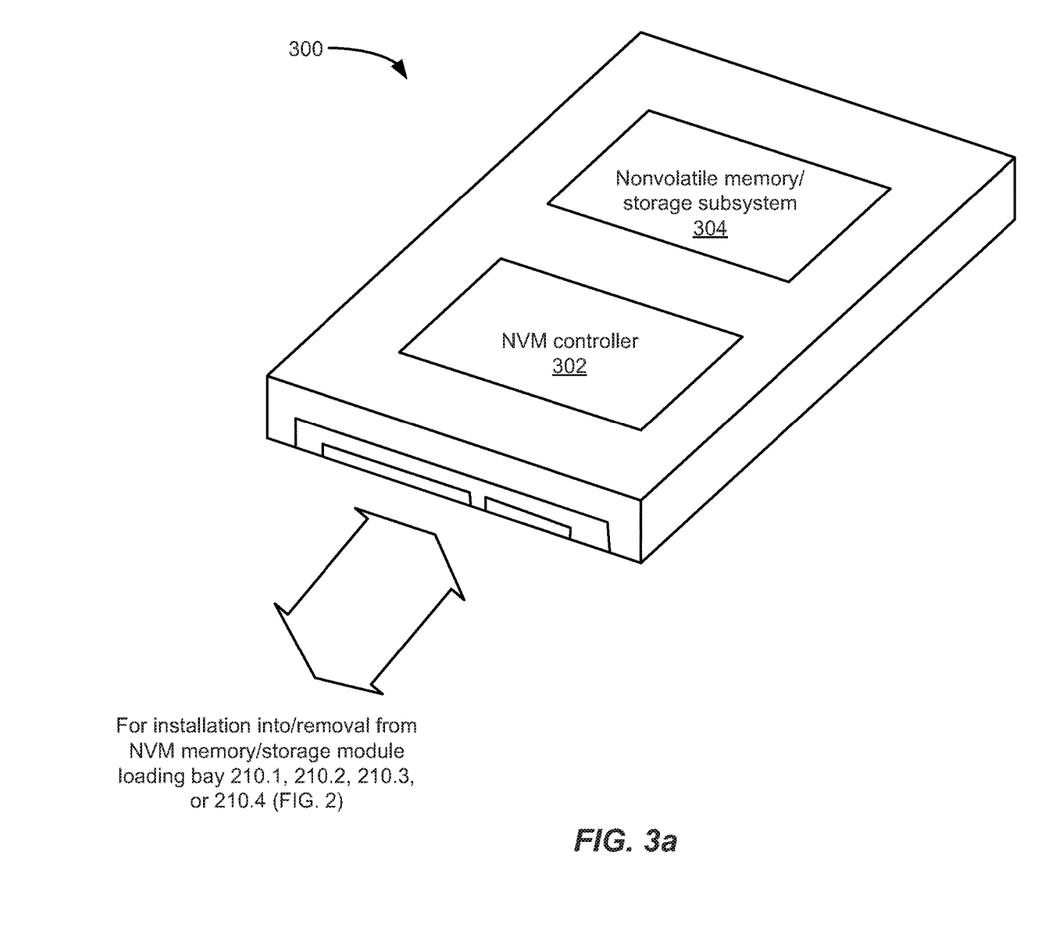
FIG. 3a is a perspective view of an exemplary nonvolatile memory/storage module that conforms to an industry standard form factor, one or more such nonvolatile memory/storage modules being included in the computer system of FIG. 2.

FIG. 3a depicts an exemplary nonvolatile memory/storage module 300 that can be received in a selected one of the respective front-loading bays 210.1, 210.2, 210.3, 210.4 of the computer system 200 (see FIG. 2). For example, the nonvolatile memory/storage module 300 may be configured to conform to an industry standard 2.5-inch form factor, or any other suitable form factor, and may be further configured to be hot-swappable, meaning that the nonvolatile memory/storage module 300 can be removed from and installed into the selected front-loading bay 210.1, 210.2, 210.3, or 210.4 without powering-down the computer system 200. As illustrated in FIG. 3a, the nonvolatile memory/storage module 300 can incorporate an NVM controller 302, as well as a nonvolatile memory/storage subsystem 304.

Figure 3B:
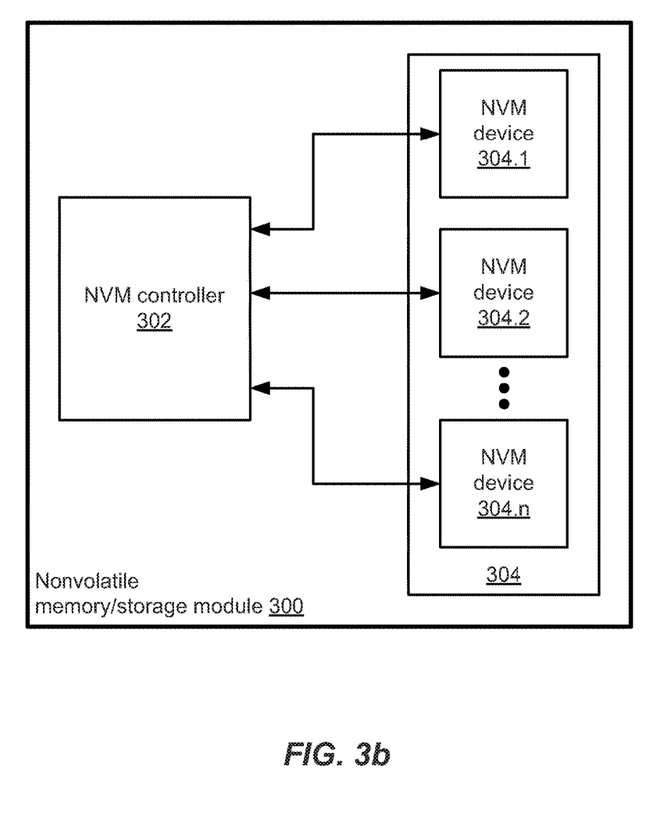

FIG. 3b depicts the NVM controller 302 and the nonvolatile memory/storage subsystem 304 incorporated in the nonvolatile memory/storage module 300. As shown in FIG. 3b, the nonvolatile memory/storage subsystem 304 can include a plurality of NVM devices 304.1, 304.2, . . . , 304.n, each of which is communicably coupled to the NVM controller 302. The NVM controller 302 is operative to handle data read/write requests issued by a processor (e.g., the processor 206.1, 206.2, 206.3, or 206.4) for reading data from, or writing data to, one or more of the respective NVM devices 304.1-304.n. As discussed herein, the nonvolatile memory (e.g., as embodied in the NVM devices 304.1, 304.2, . . . , 304.n) included in the nonvolatile memory/storage modules can be used, as desired and/or required, for persistent memory, system memory, and mass storage, as well as firmware memory. In one embodiment, the NVM devices 304.1-304.n within the nonvolatile memory/storage subsystem 304 can be dynamically shared between system memory and mass storage usages under the control of the NVM controller 302, thereby flattening a memory/storage hierarchy within the computer system 200.

Figure 4:
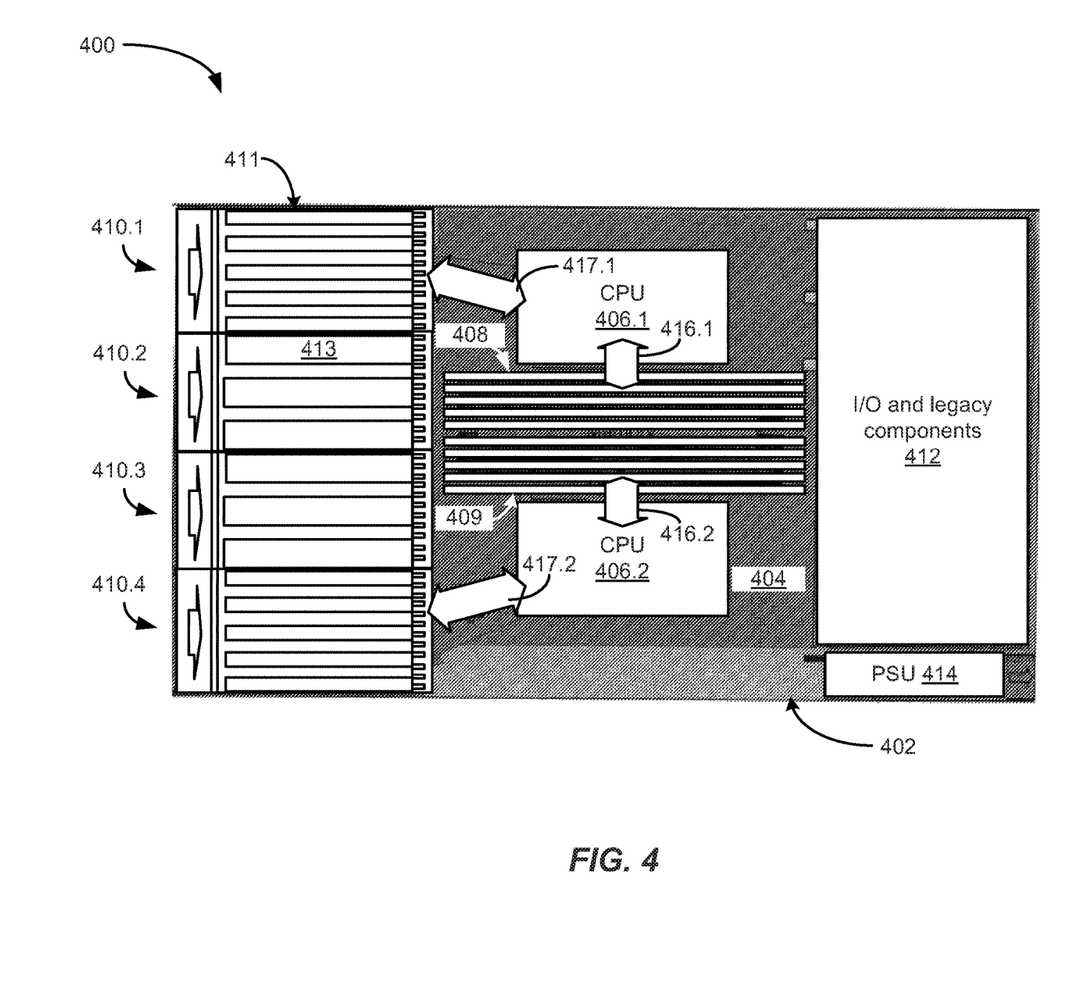
FIG. 4 is a top plan view of a first alternative embodiment of the computer system of FIG. 2.

FIG. 4 depicts a computer system 400, which is an alternative embodiment of the computer system of FIG. 2. As shown in FIG. 4, the computer system 400 includes a chassis 402, a motherboard 404 mounted to the chassis 402, and a plurality of front-loading bays 410.1, 410.2, 410.3, 410.4 mounted to the chassis 402. The motherboard 404 has a plurality of processor sockets coupled thereto for receiving a plurality of CPUs (processors) 406.1, 406.2, respectively, as well as a group of daughterboard sockets for receiving a group of auxiliary boards 408, respectively. The motherboard 404 can further have input/output (I/O) and legacy components 412 coupled thereto, and the computer system 400 can further include a power supply unit (PSU) 414 mounted to the chassis 402.

The auxiliary boards 408 are each configured to include a plurality of memory modules, such as a memory module 409. As described herein with reference to the computer system 100 (see FIG. 1), the plurality of memory modules (e.g., the memory module 409) can each include one or more DIMMs, such as DRAM-based DDR DIMMs. The DRAM-based memory modules (e.g., the memory module 409) coupled to the auxiliary boards 408 are communicably coupled to the processor 406.1 by a first plurality of memory or I/O channels (such as DDR channels 416.1), and communicably coupled to the processor 406.2 by a second plurality of memory or I/O channels, such as DDR channels 416.2.

In the computer system 400 (see FIG. 4), each of the front-loading bays 410.1, 410.4 is configured to receive a plurality of nonvolatile memory/storage modules, such as a nonvolatile memory/storage module 411 received in the front-loading bay 410.1. As described herein with reference to the computer system 200 (see FIG. 2), the nonvolatile memory/storage modules (e.g., the nonvolatile memory/storage module 411) received in the respective front-loading bays 410.1, 410.4 can include nonvolatile memory (NVM) that can be used, as desired and/or required, for persistent memory, system memory, and mass storage, as well as firmware memory, such NVM being implementable using any suitable NVM technology. Further, the mass storage devices (e.g., the mass storage device 411) may conform to an industry standard form factor, and may be configured to be hot-swappable.

Each of the front-loading bays 410.2, 410.3 is configured to receive a plurality of mass storage devices, such as a mass storage device 413 received in the front-loading bay 410.2. The mass storage devices (e.g., the mass storage device 413) received in the respective front-loading bays 410.2, 410.3 can include magnetic media (e.g., hard disc drives), optical media (e.g., compact disc (CD) drives, digital video disc (DVD) drives), etc. Further, the mass storage devices (e.g., the mass storage device 413) may conform to an industry standard form factor, and may be configured to be hot-swappable.

The nonvolatile memory/storage modules (e.g., the nonvolatile memory/storage module 411) received in the respective front-loading bays 410.1, 410.4 are communicably coupled to the processors 406.1, 406.2, respectively, by a plurality of memory channels (e.g., DDR memory channels) and/or I/O or fabric interconnects. Specifically, the nonvolatile memory/storage modules received in the front-loading bay 410.1 are communicably coupled to the processor 406.1 by DDR memory channels and/or I/O or fabric interconnects 417.1, and the nonvolatile memory/storage modules received in the front-loading bay 410.4 are communicably coupled to the processor 406.2 by DDR memory channels and/or I/O or fabric interconnects 417.2. By physically separating the DRAM-based memory modules on the auxiliary boards 408 from the nonvolatile memory/storage modules received in the front-loading bays 410.1, 410.4, the serviceability of nonvolatile memory/storage modules carrying persistent data is enhanced.

Figure 5A:
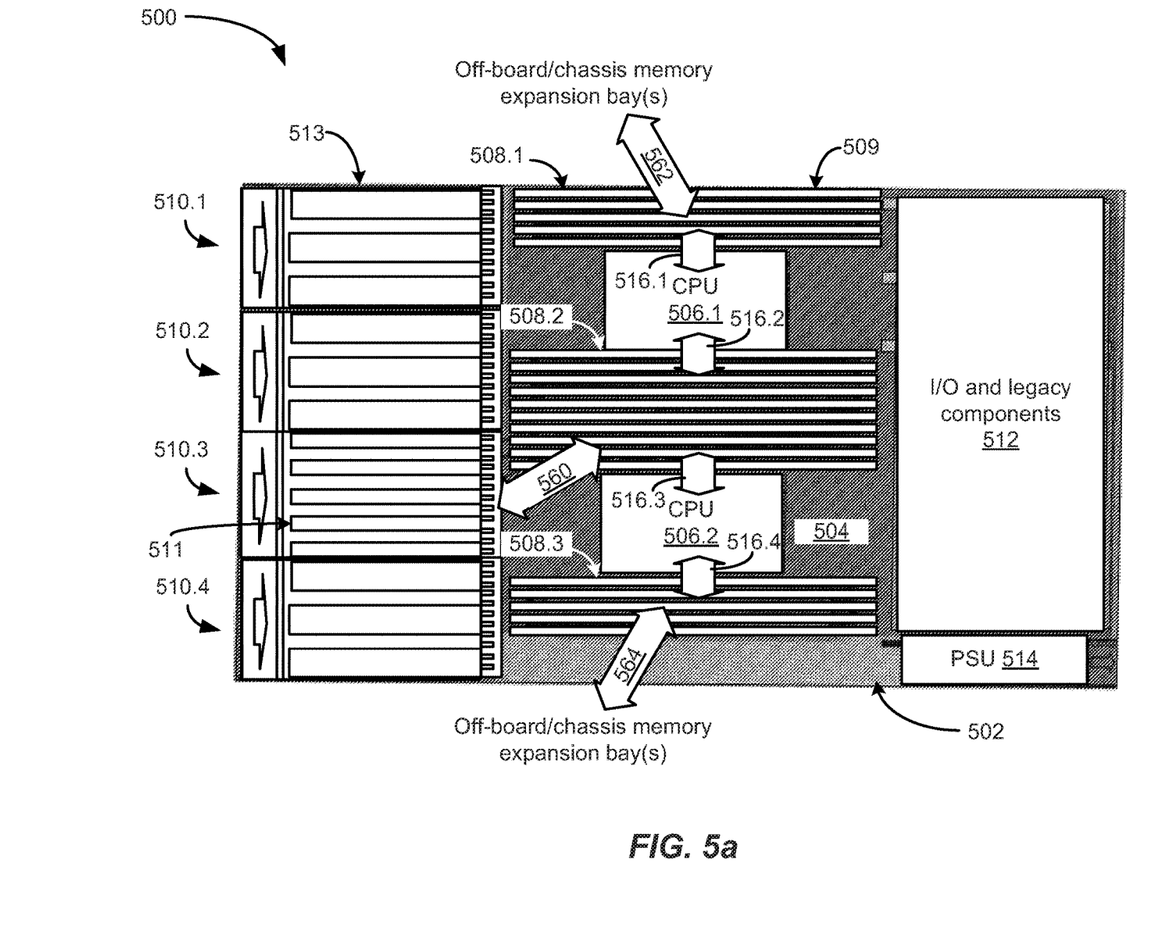
FIG. 5a is a top plan view of a second alternative embodiment of the computer system of FIG. 2.

FIG. 5a depicts a computer system 500, which is a further alternative embodiment of the computer system of FIG. 2. As shown in FIG. 5a, the computer system 500 includes a chassis 502, a motherboard 504 mounted to the chassis 502, and a plurality of front-loading bays 510.1, 510.2, 510.3, 510.4 mounted to the chassis 502. The motherboard 504 has a plurality of processor sockets coupled thereto for receiving a plurality of CPUs (processors) 506.1, 506.2, respectively, as well as a plurality of groups of daughterboard sockets for receiving a plurality of groups of auxiliary boards 508.1, 508.2, 508.3, respectively. The motherboard 504 can further have input/output (I/O) and legacy components 512 coupled thereto, and the computer system 500 can further include a power supply unit (PSU) 514 mounted to the chassis 502.

The groups of auxiliary boards 508.1, 508.2, 508.3 are each configured to include a plurality of memory modules, such as a memory module 509 included in the group of auxiliary boards 508.1. For example, the plurality of memory modules (e.g., the memory module 509) may each include one or more DIMMs, such as DRAM-based DDR DIMMs. The DRAM-based memory modules (e.g., the memory module 509) coupled to the group of auxiliary boards 508.1 are communicably coupled to the processor 506.1 by a first plurality of memory or I/O channels (such as DDR channels 516.1), and the DRAM-based memory modules coupled to the group of auxiliary boards 508.2 are communicably coupled to the processor 506.1 by a second plurality of memory or I/O channels (such as DDR channels 516.2). Further, the DRAM-based memory modules coupled to the group of auxiliary boards 508.2 are communicably coupled to the processor 506.2 by a third plurality of memory or I/O channels (such as DDR channels 516.3), and the DRAM-based memory modules coupled to the group of auxiliary boards 508.3 are communicably coupled to the processor 506.2 by a fourth plurality of memory or I/O channels (such as DDR channels 516.4).

In the computer system 500 (see FIG. 5*a*), the front-loading bay 510.3 is configured to receive a plurality of nonvolatile memory/storage modules, such as a nonvolatile memory/storage module 511. For example, the nonvolatile memory/storage modules (e.g., the nonvolatile memory/storage module 511) received in the front-loading bay 510.3 can include nonvolatile memory (NVM) that can be used, as desired and/or required, for persistent memory, system memory, and mass storage, as well as firmware memory, such NVM being implementable using any suitable NVM technology. Further, the nonvolatile memory/storage modules (e.g., the nonvolatile memory/storage module 511) may conform to an industry standard form factor, and may be configured to be hot-swappable.

Each of the front-loading bays 510.1, 510.2, 510.4 is configured to receive a plurality of mass storage devices, such as a mass storage device 513 received in the front-loading bay 510.1. The mass storage devices (e.g., the mass storage device 513) received in the respective front-loading bays 510.1, 510.2, 510.4 can include magnetic media (e.g., hard disc drives), optical media (e.g., compact disc (CD) drives, digital video disc (DVD) drives), etc. Further, the mass storage devices (e.g., the mass storage device 513) may conform to an industry standard form factor, and may be configured to be hot-swappable.

Figure 5B:
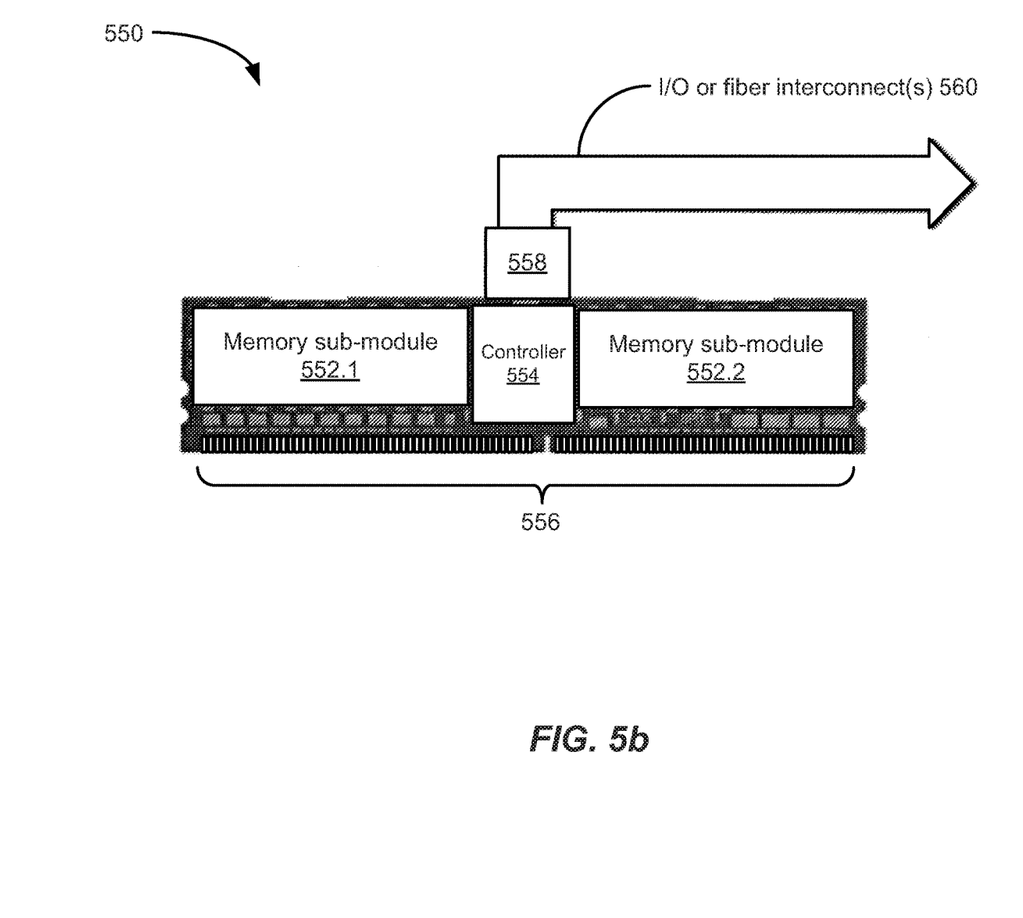

In one embodiment, the nonvolatile memory/storage modules (e.g., the nonvolatile memory/storage module 511) received in the front-loading bay 510.3 are communicably coupleable to the processors 506.1, 506.2 through one or more of the memory modules included in the group of auxiliary boards 508.2. FIG. 5*b* depicts an exemplary memory module 550 that may be located on one of the auxiliary boards within the group of auxiliary boards 508.2 (or located on another printed circuit board (PCB) connected to the respective auxiliary board) for communicably coupling the nonvolatile memory/storage module 511 (or other nonvolatile memory/storage module(s)) in the front-loading bay 510.3 to the respective processors 506.1, 506.2. As shown in FIG. 5*b*, the memory module 550 can include a plurality of memory components 552.1, 552.2 and a controller 554. For example, the memory components 552.1, 552.2 may each be configured as a volatile memory (such as a dynamic random access memory (DRAM), or any other suitable volatile memory), or a nonvolatile memory (such as a ferroelectric random access memory (FRAM), or any other suitable nonvolatile memory). In one embodiment, the memory module 550 may be configured as a DRAM-based DDR DIMM. In a further embodiment, the respective memory components 552.1, 552.2 may be configured as nonvolatile memory/storage devices including nonvolatile memory (NVM) that can be used for persistent memory and/or mass storage. In another embodiment, the respective memory components 552.1, 552.2 may be omitted from the memory module 550, in which case the memory module 550 may be configured as a so-called "dummy DIMM". The memory module 550 further includes a plurality of contacts 556 configured to be received in one or more daughterboard sockets coupled to the motherboard 504, as well as a connector 558 coupled to the controller 554 and configured to implement an I/O, fabric, optical, cable, or any other suitable high bandwidth interconnect(s) 560 (see FIGS. 5*a*, 5*b*). For example, the high bandwidth interconnect 560 may be communicably connected to (1) the nonvolatile memory/storage module 511 (or other nonvolatile memory/storage module(s)) in the front-loading bay 510.3, (2) memory on another chassis, and/or (3) another memory module like the memory module 550.

By providing the connector 558 coupled to the controller 554, as well as the contacts 556 receivable in the daughterboard socket(s) on the motherboard 504, a multi-ported capability (e.g., a dual-ported capability) can be added to the memory module 550, thereby allowing multiple connections to be established from the respective processor sockets on the motherboard 504 to the front-loading bay 510.3, memory on another chassis, and/or another memory module like the memory module 550. It is noted that one or more memory modules like the memory module 550 (see FIG. 5*b*) may also be located on one or more of the auxiliary boards within the groups of auxiliary boards 508.1, 508.3 for providing one or more high bandwidth interconnects 562, 564, respectively, to one or more off-board or off-chassis memory expansion bays.

Figure 6:
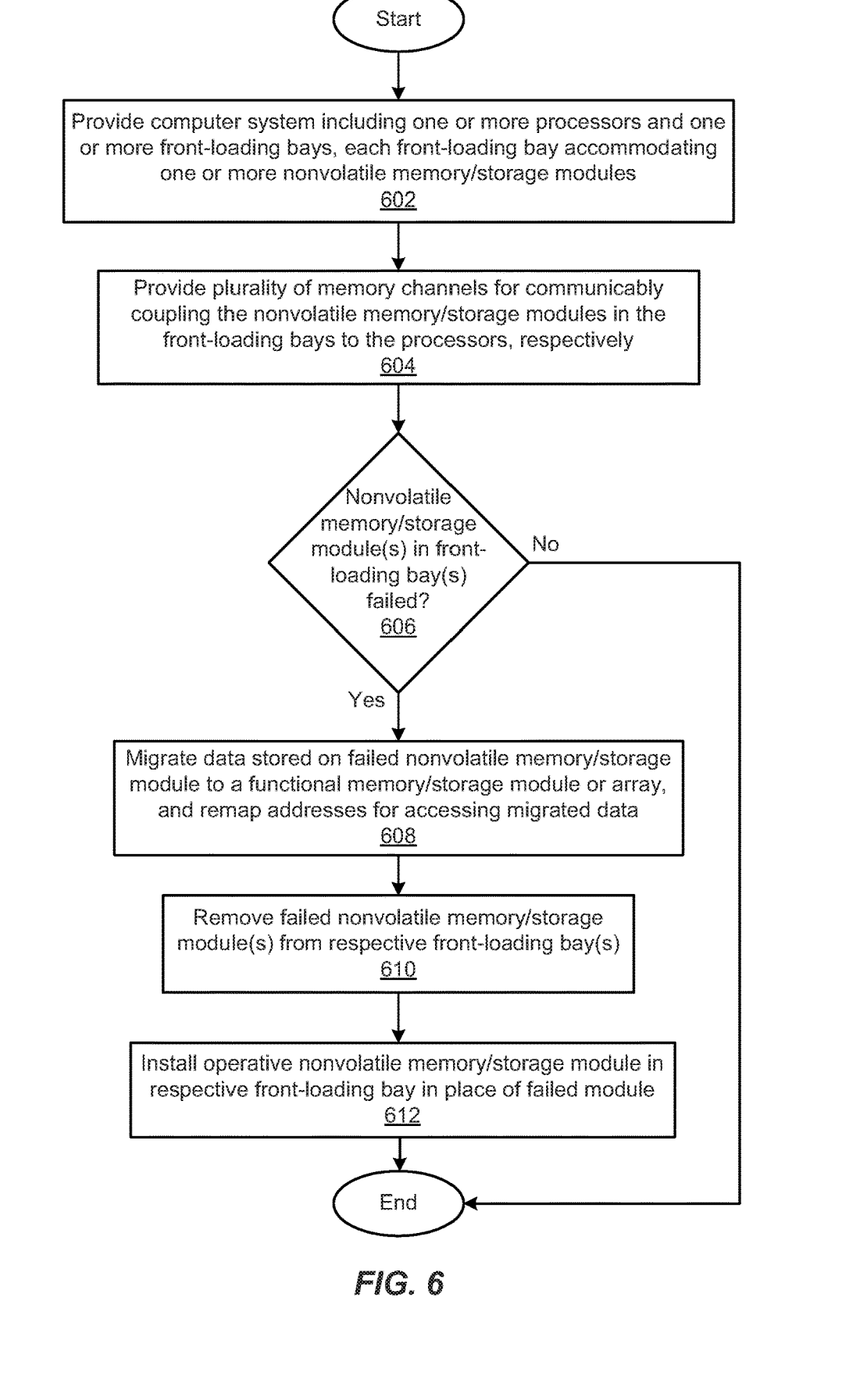
FIG. 6 is a flow diagram illustrating an exemplary method of servicing memory in the computer system of FIG. 2.

An exemplary method of servicing memory in a computer system is described below with reference to FIGS. 2 and 6. As depicted in block 602 (see FIG. 6), a computer system is provided, such as the computer system 200 (see FIG. 2), including one or more processors 206.1, 206.2, 206.3, 206.4 and one or more front-loading bays 210.1, 210.2, 210.3, 210.4, each front-loading bay accommodating one or more nonvolatile memory/storage modules. As depicted in block 604, a plurality of memory channels is provided for communicably coupling the nonvolatile memory/storage modules in the front-loading bays 210.1, 210.2, 210.3, 210.4 to the processors 206.1, 206.2, 206.3, 206.4, respectively. As depicted in block 606, a determination is made as to whether or not one of the nonvolatile memory/storage modules in the respective front-loading bays 210.1, 210.2, 210.3, 210.4 has failed. In the event one of the nonvolatile memory/storage modules in the respective front-loading bays 210.1, 210.2, 210.3, 210.4 has failed, data stored on the failed nonvolatile memory/storage module are migrated to a functional memory/storage module or array, and addresses for accessing the migrated data are remapped accordingly, as depicted in block 608. It is noted that such data migration and address remapping can at least partially be avoided by duplicating the data using one or more data mirrors, or by data redundancy. The failed nonvolatile memory/storage module is removed from the respective front-loading bay, as depicted in block 610. As depicted in block 612, an operative nonvolatile memory/storage module is installed in the respective front-loading bay in place of the failed module.

Figure 7:
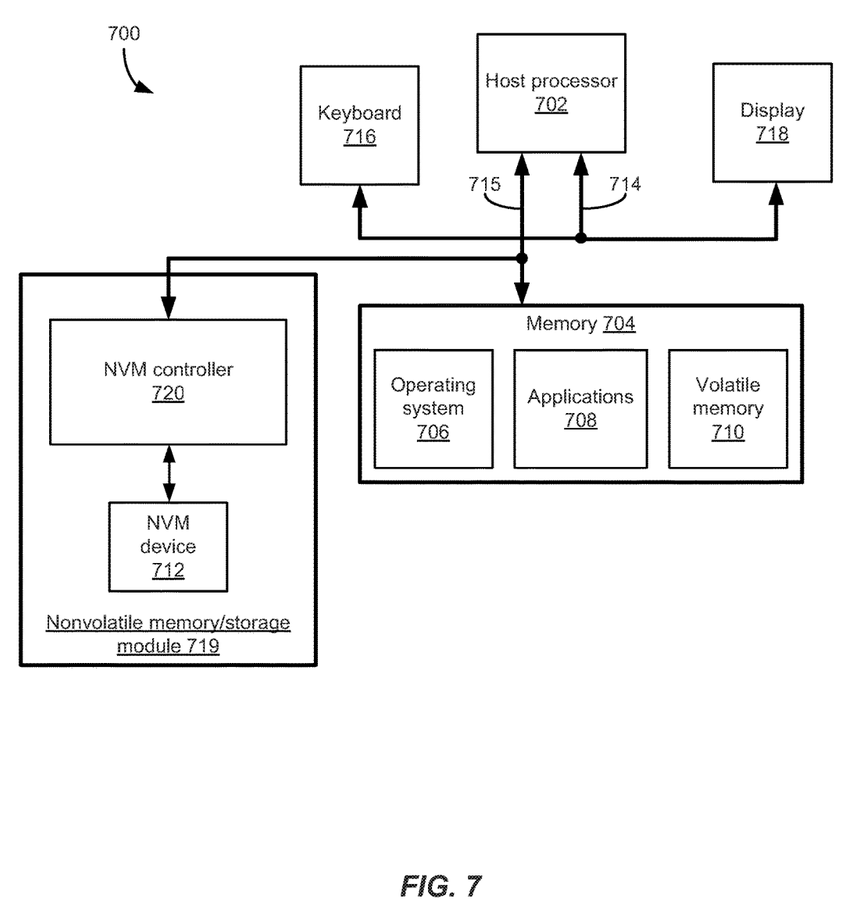
FIG. 7 is a block diagram of functional components included in the computer system of FIG. 2.

FIG. 7 depicts an exemplary computer system 700 that can be configured to implement apparatus and methods of the claimed invention. As shown in FIG. 7, the computer system 700 can include a host processor 702 communicably coupled to at least one memory 704 and at least one nonvolatile memory/storage module 719 by at least one memory channel 715. The nonvolatile memory/storage module 719 can include an NVM controller 720 and at least one NVM device 712. The computer system 700 can further include a keyboard 716 and a display 718, each being communicably coupled to a system bus 714. The NVM controller 720 is operative to access persistent data storable within the NVM device 712. The host processor 702 is operative to execute instructions stored on at least one non-transitory storage medium, such as the memory 704 or any other suitable storage medium, for performing various processes within the computer system 700, including one or more processes for controlling operations of the NVM controller 720. The memory 704 can include one or more memory components such as a volatile memory 710, which may be implemented as dynamic random access memory (DRAM) or any other suitable volatile memory. The memory 704 can also be configured to store an operating system 706 executable by the host processor 702, as well as one or more applications 708 that may be run by the operating system 706. In response to a request generated by one of the applications 708, the host processor 702 can execute the operating system 706 to perform desired data write/read operations on the volatile memory 710, and/or desired write/read operations on the NVM device 712 via the NVM controller 720.

It is noted that FIG. 7 illustrates an exemplary embodiment of the computer system 700, and that other embodiments of the computer system 700 may include more apparatus components, or fewer apparatus components, than the apparatus components illustrated in FIG. 7. Further, the apparatus components may be arranged differently than as illustrated in FIG. 7. In addition, functions performed by various apparatus components contained in other embodiments of the computer system 700 may be distributed among the respective components differently than as described herein.

Having described the above exemplary embodiments of the disclosed systems and methods, other alternative embodiments or variations may be made. For example, it was described herein that the nonvolatile memory/storage modules (such as the nonvolatile memory/storage module 300; see FIG. 3*a*) might be configured to conform to an industry standard 2.5-inch form factor, or any other suitable form factor. In one embodiment, the nonvolatile memory/storage modules may be configured as registered dual in-line memory modules (RDIMMs), small outline dual in-line memory modules (SODIMMs), load-reduced DIMMs (LRDIMMs), mini-DIMMs, unbuffered DIMMs, or any other suitable memory modules. Further, the front-loading bays (e.g., the front-loading bays 210.1, 210.2, 210.3, 210.4) may be suitably configured to accommodate such RDIMMs, SODIMMs, LRDIMMs, mini-DIMMs, unbuffered DIMMs, etc.

It was also described herein that a multi-ported capability (e.g., a dual-ported capability) can be added to DRAM-based memory modules (e.g., the memory module 550; see FIG. 5*b*) to allow multiple connections to be established, e.g., from processor sockets on the motherboard of a computer system to one or more front-loading bays accommodating nonvolatile memory/storage modules. In one embodiment, such dual connections can be established from the processor sockets to the front-loading bays by locating a controller like the controller 554 (see FIG. 5*b*), as well as a connector like the connector 558 (see FIG. 5*b*), on a processor board instead of within the memory module 550.

The following examples pertain to further illustrative embodiments of the disclosed systems and methods. Example 1 is a computer system implementing a server architecture configured to facilitate servicing of nonvolatile memory components in the computer system. The computer system includes a chassis, a motherboard mounted to the chassis, and one or more module bays mounted to the chassis. The motherboard is configured to receive one or more processors. One or more of the module bays are configured to receive one or more nonvolatile memory/storage modules, respectively. Each nonvolatile memory/storage module is operative to perform persistent memory and mass storage operations. The computer system further includes one or more first memory channels for communicably coupling the one or more nonvolatile memory/storage modules to the one or more processors, respectively.

In Example 2, the subject matter of Example 1 can optionally include features wherein the first memory channels include one of double data rate (DDR) memory channels, input/output (I/O) interconnects, and fabric interconnects.

In Example 3, the subject matter of any one of Examples 1-2 can optionally include features wherein the nonvolatile memory/storage modules are configured to conform to a predetermined industry-standard form factor.

In Example 4, the subject matter of any one of Examples 1-3 can optionally include features wherein the nonvolatile memory/storage modules are configured to be hot-swappable.

In Example 5, the subject matter of any one of Examples 1-4 can optionally include features wherein at least one of the nonvolatile memory/storage modules is configured as a solid-state drive (SSD).

In Example 6, the subject matter of any one of Examples 1-5 can optionally include features wherein at least one of the first memory channels is configured as a Peripheral Component Interconnect express (PCIe) bus.

In Example 7, the subject matter of Example 1 can optionally include features wherein the motherboard is configured to receive one or more auxiliary boards, at least one of the auxiliary boards being configured to include one or more memory modules.

In Example 8, the subject matter of Example 7 can optionally include features wherein the memory modules include one of dynamic random access memory (DRAM)-based memory modules, and DRAM-based double data rate (DDR) dual in-line memory modules.

In Example 9, the subject matter of any one of Examples 7-8 can optionally include one or more second memory channels for communicably coupling the one or more memory modules to the one or more processors, respectively.

Example 10 is a computer system that implements a server architecture configured to facilitate servicing of nonvolatile memory components in the computer system. The computer system includes a chassis, a motherboard mounted to the chassis, and one or more module bays mounted to the chassis. The motherboard is configured to receive one or more processors and one or more auxiliary boards. At least one of the auxiliary boards is configured to include one or more memory modules. One or more of the module bays are configured to receive one or more nonvolatile memory/storage modules, respectively. Each nonvolatile memory/storage module is operative to perform persistent memory and mass storage operations. The computer system further includes one or more first memory channels for communicably coupling the one or more nonvolatile memory/storage modules to the one or more memory modules, and one or more second memory channels for communicably coupling the one or more memory modules to the one or more processors.

In Example 11, the subject matter of Example 10 can optionally include features wherein at least one of the memory modules includes a controller operative to access at least one of the nonvolatile memory/storage modules over at least one of the first memory channels.

In Example 12, the subject matter of any one of Examples 10-11 can optionally include features wherein at least one of the memory modules includes the controller operative to access at least one of the processors over at least one of the second memory channels.

In Example 13, the subject matter of any one of Examples 10-12 can optionally include features wherein the memory modules include one of dynamic random access memory (DRAM)-based memory modules, and DRAM-based double data rate (DDR) dual in-line memory modules.

In Example 14, the subject matter of any one of Examples 10-13 can optionally include features wherein at least one of the memory modules is a multi-ported memory module.

In Example 15, the subject matter of Example 14 can optionally include features wherein the multi-ported memory module includes the controller, a plurality of volatile or nonvolatile memory sub-modules communicably coupled to the controller, a first interconnect operative to communicably couple the controller and the plurality of volatile or nonvolatile memory sub-modules to one or more of the first memory channels, and a second interconnect operative to communicably couple the controller and the plurality of volatile or nonvolatile memory sub-modules to one or more of the second memory channels.

In Example 16, the subject matter of any one of Examples 10-14 can optionally include features wherein at least one of the memory modules is a dummy dual in-line memory module (DIMM).

In Example 17, the subject matter of Example 10 can optionally include features wherein the nonvolatile memory/storage modules are configured to conform to a predetermined industry-standard form factor.

In Example 18, the subject matter of any one of Examples 10 and 17 can optionally include features wherein the nonvolatile memory/storage modules are configured to be hot-swappable.

Example 19 is a multi-ported memory module that includes a controller, a plurality of volatile or nonvolatile memory modules communicably coupled to the controller, a first interconnect operative to communicably couple the controller and the plurality of volatile or nonvolatile memory modules to a circuit board, and a second interconnect operative to communicably couple the controller and the plurality of volatile or nonvolatile memory modules to one or more memory channels.

Example 20 is a computer system that includes a system bus, a memory bus, a display communicably coupled to the system bus, and the multi-ported memory module of Example 19 communicably coupled to the memory bus.

Example 21 is a method of servicing memory in a computer system that includes providing a computer system, the computer system including one or more processors and one or more memory module bays, one or more of the memory module bays accommodating one or more nonvolatile memory/storage modules, respectively, each nonvolatile memory/storage module being operative to perform persistent memory and mass storage operations, providing a plurality of memory channels for communicably coupling the nonvolatile memory/storage modules in the memory module bays to the processors, determining whether one of the nonvolatile memory/storage modules in the respective memory module bays has failed, having determined that one of the nonvolatile memory/storage modules in the respective memory module bays has failed, removing the failed nonvolatile memory/storage module from the respective memory module bay, and installing an operative nonvolatile memory/storage module in the respective memory module bay in place of the failed module.

In Example 22, the subject matter of Example 21 can optionally include using the operative nonvolatile memory/storage module as one or more of persistent memory and mass storage.

Example 23 is a method of servicing memory in a computer system that includes means for providing a computer system, the computer system including one or more processors and one or more memory module bays, one or more of the memory module bays accommodating one or more nonvolatile memory/storage modules, respectively, each nonvolatile memory/storage module being operative to perform persistent memory and mass storage operations, means for providing a plurality of memory channels for communicably coupling the nonvolatile memory/storage modules in the memory module bays to the processors, means for determining whether one of the nonvolatile memory/storage modules in the respective memory module bays has failed, having determined that one of the nonvolatile memory/storage modules in the respective memory module bays has failed, means for removing the failed nonvolatile memory/storage module from the respective memory module bay, and means for installing an operative nonvolatile memory/storage module in the respective memory module bay in place of the failed module.

In Example 24, the subject matter of Example 23 can optionally include means for using the operative nonvolatile memory/storage module as one or more of persistent memory and mass storage.

Although illustrative examples of various embodiments of the disclosed subject matter are described herein, one of ordinary skill in the relevant art will appreciate that other manners of implementing the disclosed subject matter may alternatively be used. In the preceding description, various aspects of the disclosed subject matter have been described. For purposes of explanation, specific systems, apparatus, methods, and configurations were set forth in order to provide a thorough understanding of the disclosed subject matter. However, it will be apparent to one skilled in the relevant art having the benefit of this disclosure that the subject matter may be practiced without the specific details described herein. In other instances, well-known features, components, and/or modules were omitted, simplified, or combined in order not to obscure the disclosed subject matter.

It is noted that the term "operative to", as employed herein, means that a corresponding device, system, apparatus, etc., is able to operate, or is adapted to operate, for its desired functionality when the device, system, or apparatus is in its powered-on state. Moreover, various embodiments of the disclosed subject matter may be implemented in hardware, firmware, software, or some combination thereof, and may be described by reference to, or in conjunction with, program code such as instructions, functions, procedures, data structures, logic, application programs, design representations, and/or formats for simulation, emulation, and/or fabrication of a design, which when accessed by a machine results in the machine performing tasks, defining abstract data types or low-level hardware contexts, or producing a result.

It is further noted that the techniques illustrated in the drawing figures can be implemented using code and/or data stored and/or executed on one or more computing devices, such as general-purpose computers or computing devices. Such computers or computing devices store and communicate code and/or data (internally and/or with other computing devices over a network) using machine-readable media such as machine readable storage media (e.g., magnetic disks, optical disks, random access memory (RAM), read only memory (ROM), flash memory devices, phase-change memory) and machine readable communication media (e.g., electrical, optical, acoustical, or other form of propagated signals such as carrier waves, infrared signals, digital signals, etc.).

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A system implementing a server architecture, comprising:
   a chassis;
   a motherboard mounted to the chassis; and
   one or more module bays mounted to the chassis,
   wherein the motherboard is configured to receive one or more processors,
   wherein the motherboard is further configured to receive one or more auxiliary boards, at least one of the auxiliary boards being configured to include one or more volatile memory modules, at least one of the one or more volatile memory modules is a dummy dual in-line memory module (DIMM),
   wherein one or more of the module bays are configured to receive one or more nonvolatile memory/storage modules, respectively, each nonvolatile memory/storage module being operative to perform persistent memory and mass storage operations and including byte-addressable nonvolatile memory; and
   wherein the system further comprises:
      one or more first memory channels for communicably coupling the one or more nonvolatile memory/storage modules to the one or more volatile memory modules; and
      one or more second memory channels for communicably coupling the one or more volatile memory modules to the one or more processors.

2. The system of claim 1 wherein at least one of the volatile memory modules includes a controller operative to access at least one of the nonvolatile memory/storage modules over at least one of the first memory channels.

3. The system of claim 2 wherein at least one of the volatile memory modules includes the controller operative to access at least one of the processors over at least one of the second memory channels.

4. The system of claim 1 wherein the volatile memory modules include one of dynamic random access memory (DRAM)-based memory modules, and DRAM-based double data rate (DDR) dual in-line memory modules.

5. The system of claim 1 wherein at least one of the volatile memory modules is a multi-ported memory module.

6. The system of claim 5 wherein the multi-ported memory module comprises:
   a controller;
   a plurality of volatile memory sub-modules communicably coupled to the controller;
   a first interconnect operative to communicably couple the controller and the plurality of volatile memory sub-modules to one or more of the first memory channels; and
   a second interconnect operative to communicably couple the controller and the plurality of volatile memory sub-modules to one or more of the second memory channels.

7. The system of claim 1 wherein the nonvolatile memory/storage modules are configured to conform to a predetermined industry-standard form factor.

8. The system of claim 1 wherein the nonvolatile memory/storage modules are configured to be hot-swappable.

9. The system of claim 1, the byte-addressable nonvolatile memory comprises polymer memory, phase-change memory (PCM), nanowire-based charge-trapping memory, ferrorelectric transistor random access memory (FeTRAM), 3-dimensional cross-point memory, memristor memory, ovonic unified memory, chalcogenide random access memory, magneto-resistive random access memory (MRAM), ferromagnetic memory or spin-transfer torque random access memory.

10. The system of claim 1, comprising the motherboard to include the one or more processors.

* * * * *